UNITED STATES PATENT OFFICE.

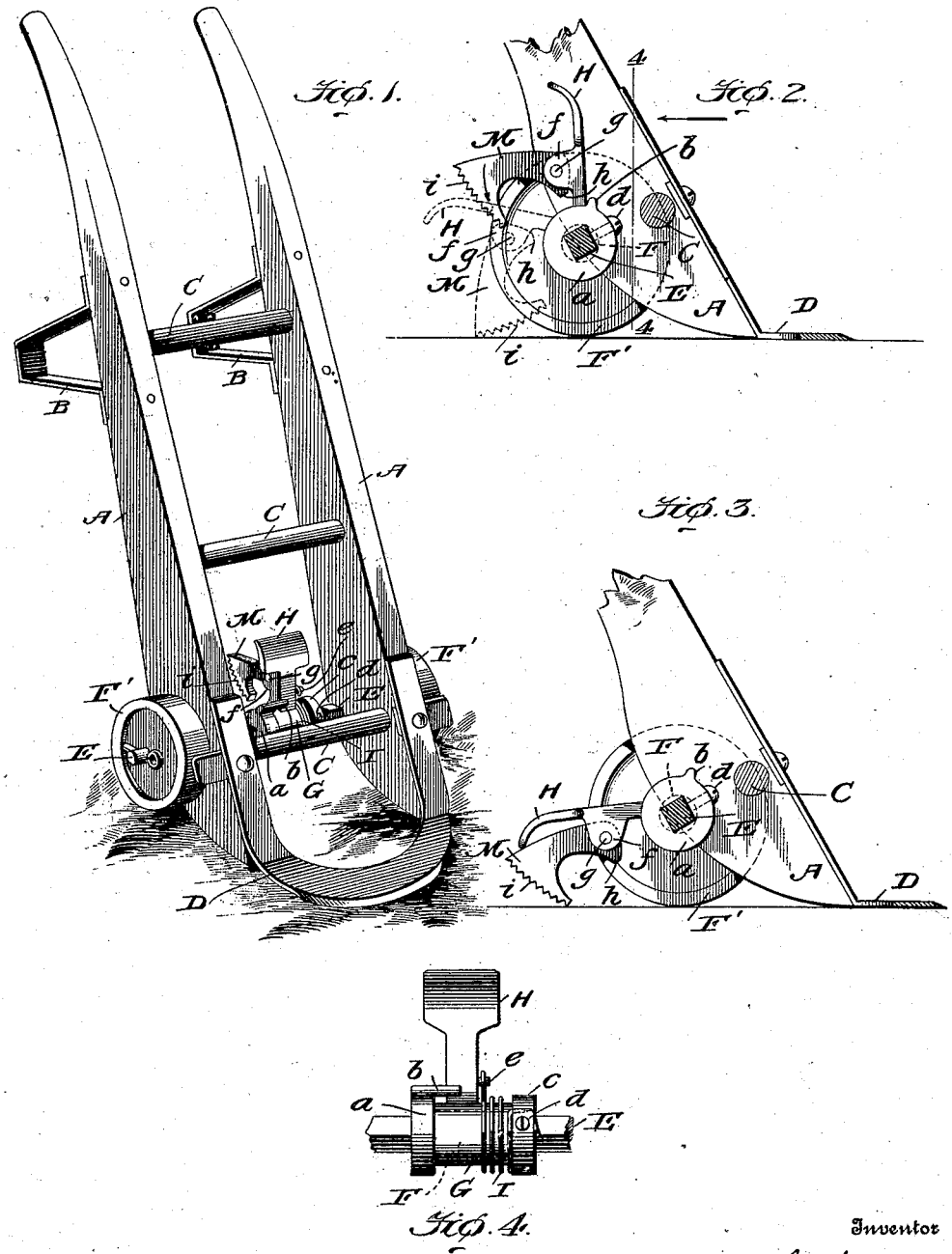

UBALD HEBERT, OF MANCHESTER, NEW HAMPSHIRE.

TRUCK.

No. 923,171. Specification of Letters Patent. Patented June 1, 1909.

Application filed May 14, 1908. Serial No. 432,893.

*To all whom it may concern:*

Be it known that I, UBALD HEBERT, citizen of the United States, residing at Manchester, in the county of Hillsboro and State of New Hampshire, have invented new and useful Improvements in Trucks, of which the following is a specification.

My invention pertains to trucks such as are designed more particularly for moving barrels, boxes and the like; and it has for its general object to provide a truck embodying simple, durable and efficient means through the medium of which an operator may check a truck against backward movement during the loading of heavy articles thereon and may also expeditiously and easily move the truck forward under a barrel or other article when occasion demands that the latter be done.

The invention in all of its details will be fully understood from the following description and claims when the same are read in connection with the drawings, accompanying and forming part of this specification, in which:

Figure 1 is a perspective view illustrating a truck provided with my improvements; the said truck being shown in the position in which it is placed when a barrel or the like is to be put thereon. Fig. 2 is a detail vertical section illustrating by full lines the pedal lever and the rocking check in their idle position, and by dotted lines said lever and check in the position in which they are placed to check or hold the truck against casual backward movement. Fig. 3 is a view similar to Fig. 2, but showing the pedal lever and the check in the positions the same occupy subsequent to depression of the pedal lever to rock the check on a floor or other surface and thereby move the truck forward to place the flange thereof under a barrel or other article. Fig. 4 is a detail view taken from the point indicated by the plane line 4—4 of Fig. 2, looking rearward, and illustrating the manner in which I prefer to arrange and secure my improvements on the axle of the truck.

Similar letters designate corresponding parts in all of the views of the drawings, referring to which:

A A are the side bars of a truck. B B are the truck legs. C C are cross-bars connecting the side bars A. D is the flange of the truck carried at the forward ends of the side bars A. E is the axle, and F' F', the wheels. These parts may be and preferably are of the ordinary, well known construction; the side bars A and cross-bars C being of wood, while the other parts mentioned are of metal. At this point, however, I desire it understood that while the parts mentioned are preferably of the conventional construction, the said parts may be of any other construction consonant with the purpose of my invention, without involving departure from the scope of the invention as defined in the claims appended.

As clearly shown in Figs. 2 and 3, I prefer to make the intermediate portion of the axle E of angular form in cross-section, and in the preferred application of my invention I employ a sleeve F illustrated by dotted lines in Fig. 4, which sleeve is provided with an angular bore snugly receiving the axle E, whereby the sleeve is held against turning about the axle. At one end the sleeve F is provided with a flange or enlargement $a$ on which is an inwardly directed arm $b$, illustrated in Figs. 4 and 1. On the opposite end of the sleeve F, with reference to the flange $a$, is arranged a collar $c$, and to hold the said collar on the sleeve I employ the screw $d$ which extends through both collar and sleeve, as shown by dotted lines in Fig. 3, and is set against the axle E with a view of serving the additional purpose of fixing the sleeve F against endwise movement on the axle E.

Exteriorly the sleeve F is of circular form in cross-section, see dotted lines in Figs. 2 and 3, and on the said portion of the sleeve and between the flange $a$ thereof and the collar $c$ is rotatably mounted a sleeve G at one end of a pedal lever H, having at one side a lateral projection $e$. This latter is for the purpose of enabling a spring I which bears there against to return the pedal lever to and yieldingly retain the same under normal conditions in the position illustrated in Fig. 1, and by full lines in Fig. 2; the said spring I being coiled about the sleeve G and being connected at one end to the collar c as clearly shown in Fig. 4. By virtue of this arrangement it will be manifest that when the pedal lever H is depressed the spring I will be put under tension, and hence when pressure is removed from pedal lever, the spring will expand and by so doing will return the pedal lever to and normally hold the same in the position shown in Figs. 1 and 4—i. e., against the arm b which serves as a stop to limit forward movement of the said lever.

At its under side the pedal lever H is provided with parallel lugs f, but one of which is shown, and pivoted between the said lugs at g is the vertically swinging check M of my improved mechanism. The said check M is provided at its upper end with a head h which by bringing up against the under side of the lever H is designed to prevent the check swinging in the direction indicated by arrow in Fig. 2 beyond the position shown by full lines in said figure, and this without interfering with movement of the check in the direction opposite to that indicated by arrow with respect to the lever. The lower end of the check M is preferably formed to describe an arc of a circle, and is toothed as indicated by i for a purpose presently set forth.

The practical use of my improvements is as follows: When the truck while in the position shown in Figs. 1 and 2 is to be secured against casual rearward movement the operator with his foot depresses the lever to the position shown by dotted lines in Fig. 1 and thereby puts and holds the check M in engagement with the floor, as also shown by dotted lines in said figure, in which position the check will securely hold the truck against backward movement and in that way will facilitate the placing of a barrel or other heavy article on the truck. When it is necessary while the truck is in the position shown in Figs. 1 and 2, to advance the truck so as to shove the flange D thereof under a barrel or other article, the lever H and the check M are moved beyond the positions shown by dotted lines in Fig. 2— i. e., into the positions shown in Fig. 3, whereby, as will be manifest by comparison of Figs. 2 and 3, the truck will be moved forward for the purpose stated. When the pedal lever is in either of its depressed positions and pressure is removed from said lever, the spring I will operate to immediately return the said pedal lever and the check M to the raised positions thereof, and consequently it will be understood that my improvements will in no way interfere with the truck being used and moved in the well known conventional manner.

It will be gathered from the foregoing that my improvements are simple and inexpensive, and that the present embodiment of my invention is adapted to be readily applied to trucks such as at present in use.

Having described my invention, what I claim and desire to secure by Letters-Patent, is:

1. The combination of a wheeled truck, a lever pivoted to the truck and movable upwardly toward the forward part of the truck and downwardly away from said part, and a fore and aft swinging check pivoted to and depending from the lever and provided with means which is engaged with a floor by depression of the lever and is rocked on the floor by further depression of the lever, in a direction to advance the truck.

2. The combination of a wheeled truck, a lever pivoted to the truck and movable upwardly toward the forward part thereof and downwardly away from said forward part, a fore and aft swinging check pivoted to the lever at an intermediate point in the length thereof and depending from the lever and having an end, remote from the lever, adapted to engage the surface on which the truck is arranged and also having a portion, adjacent the lever, adapted to coöperate with said lever to limit downward and forward movement of the check on the lever, means for raising the lever when pressure is removed therefrom and for yieldingly maintaining the lever in its raised position, and means for limiting the upward and forward movement of the lever.

3. The combination of a wheeled truck, a vertically swinging lever supported in the truck, a check pivoted to and depending from the lever, at an intermediate point in the length thereof, and arranged to swing vertically and fore and aft on the lever and having a head at its upper end for engaging the under side of the lever and limiting forward movement of the check with respect thereto, and also having a lower end which describes a part of a circle and is toothed, and means for raising the lever and for yieldingly holding the lever in its raised position.

4. The combination with a truck comprising side bars connected together, a flange extending forward of said side bars, an axle arranged in the side bars, and wheels on said axle; of a sleeve having an angular bore receiving the angular portion of the axle and also having a flange at one end and an arm extending inwardly from said flange, a collar mounted on the opposite end of the sleeve and secured against turning, a vertically swinging lever having a sleeve mounted on and movable about the first named sleeve, between the flange of the sleeve and the said collar, a spring coiled about one of the sleeves and connected at one of its ends to the collar and at its opposite end to the pedal lever, and a check pivoted to and depending from the lever, at an intermediate point in the length thereof, to swing vertically and fore and aft thereon, and having a head at its upper end for engaging the under side of the lever and also having a lower end which describes a part of a circle and is toothed.

In testimony whereof I have hereunto set my hand in presence of two subscribing witnesses.

UBALD HEBERT.

Witnesses:
J. E. SYLVESTRE,
J. A. BOIVIN.